(No Model.)

H. F. WILLIAMS.
VAPORIZER.

No. 404,240. Patented May 28, 1889.

WITNESSES:
Gustave Dieterich
M. Boech

INVENTOR,
Herbert F. Williams,
BY Park Benjamin
his ATTORNEY.

UNITED STATES PATENT OFFICE.

HERBERT F. WILLIAMS, OF BROOKLYN, NEW YORK.

VAPORIZER.

SPECIFICATION forming part of Letters Patent No. 404,240, dated May 28, 1889.

Application filed January 16, 1889. Serial No. 296,537. (No model.)

*To all whom it may concern:*

Be it known that I, HERBERT F. WILLIAMS, of Brooklyn, Kings county, New York, have invented a new and useful Improvement in Vaporizers, of which the following is a specification.

My invention relates to an apparatus for charging an air-current with vapor from a liquid.

My invention consists in the construction hereinafter set forth, whereby the air-current is delivered above the surface of said liquid to be vaporized, whereby said current or the vessel containing the liquid is heated, and whereby the heat of said current or of said liquid is regulated at will.

Figure 1:
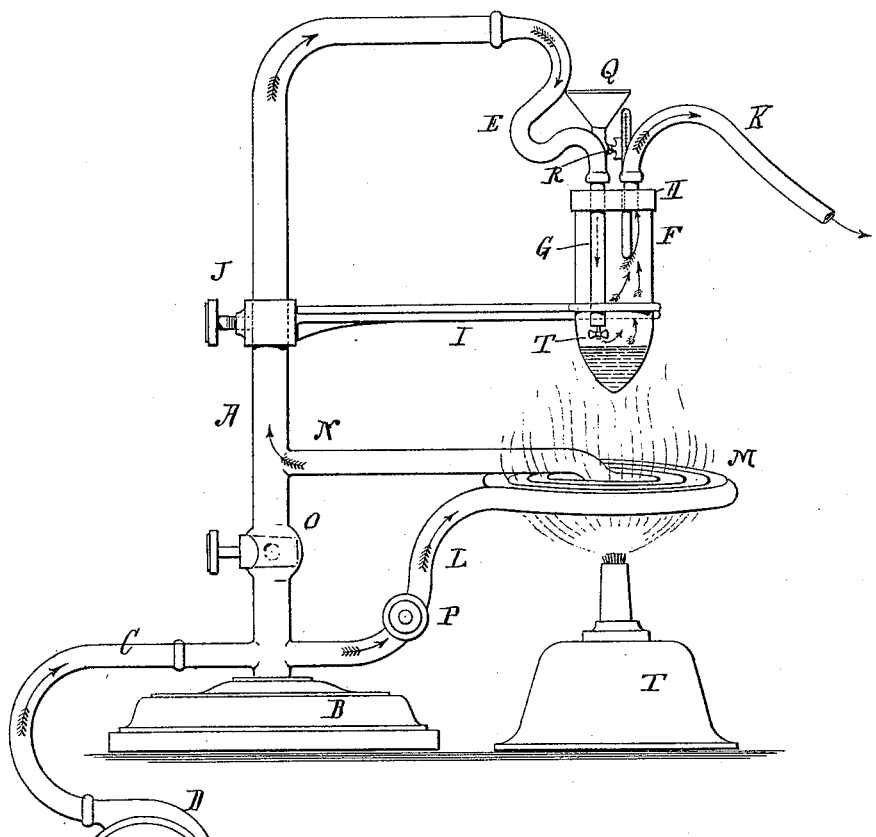
Figure 2:
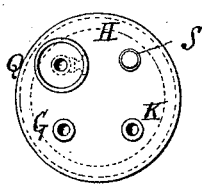

In the accompanying drawings, Figure 1 is an elevation of my apparatus. Fig. 2 is a plan view of the top of the vessel containing the liquid to be vaporized.

A is a tube supported on any suitable standard, as base B. Near the lower portion of said tube is a branch pipe leading to any suitable source of compressed air D—such as a blower or cylinder in which compressed air is stored. At the upper end of tube A is secured a flexible tube, E, whereby the current of air is conveyed into the vessel F by means of the pipe G, which passes through the cover H of said vessel. The vessel F is preferably made of glass, and is also preferably conical or pointed at its lower end. It is supported in a bracket, I, which is secured upon the vertical tube A, and may be raised or lowered therein at will by loosening the set-screw J. The current of air entering the vessel F escapes therefrom by the tube K, which communicates with an opening in the cover H. Extending from the lower portion of the tube A is a pipe, L, which is coiled in the form of a flat coil, as shown at M, and which communicates farther along or higher up with the tube A, as at N. In the tube A, and between the connecting points thereof of the pipe L, is a valve, O, and in the tube L is arranged a similar valve, P.

Passing through the cover H of vessel F is a filling-tube, Q, having a suitable funnel at its upper end, and provided with a stop-cock, R, and also a thermometer, S, which extends down into the said vessel F. The lower end of tube G in vessel F is open; but said tube supports in any suitable manner a fan-wheel, T, which is set in rapid rotation by the escape of air from the tube G.

The operation of the device is as follows: A lamp, T, or other source of heat is arranged below the coil M in the pipe L. The valve O is shut and the valve P is open. The air or gas delivered from the source of supply D then passes in the direction of the arrows through the tubes C and L, becomes heated in the coil M, and enters the tube A at N, then passes to the tube E, and so through the tube G. Meanwhile the liquid which it is desired that the air or gas current should take up in vaporized form is placed in the bottom of the vessel F. The air or gas jet escaping from the tube G sets the wheel T in rapid rotation, and is thus scattered or dispersed over the surface of the liquid and causes at said surface rapid evaporation, whereby said air or gas becomes strongly charged or permeated with the liquid particles and carries the same off in this current through the tube K to the place where the jet is to be used. By means of the valves O and P the heat of the air or gas current admitted to the vessel F may be very nicely regulated. By opening or closing more or less the valve O the greater or less portion of the air may be caused to pass directly into the tube A, thus avoiding the coil and so not becoming heated, and at the point N a mixture of the cold and warmed air is effected, so that the resulting current may be of any desired degree of temperature.

It will be observed that I have arranged the vessel F directly above the coil M, and hence in a position whereby it may be directly heated by the flame of the lamp. By this means I may increase the rate of evaporation of the liquid beyond that due to the impact current of hot gas with its surface, and by loosening the screw J and raising or lowering the bracket I, I may move the vessel F nearer to or farther from the source of heat, and thus make the evaporation more or less rapid, as it is desired. The thermometer S affords a convenient means of regulating the temperature of the air or gas within the vessel F, and hence that of the jet, which is delivered at the desired point. The liquid to be evaporated may be placed in the tube F, any accurately-measured quantity being inserted therein through the tube Q, which is subsequently closed by the stop-cock R.

It will be apparent that I may use my above-described apparatus in a variety of different ways. Thus I may close the valve P, open the valve O, and remove the source of heat, T. In that case a current of cold air will pass through the tube A and become impregnated with the liquid in vessel F, the result being a jet substantially similar to that delivered by an ordinary atomizer; or, leaving the valve in the position above described, I may add the source of heat, which will then heat only the vessel F and its contents, no air circulating through the coil M. In that case a current of cold air will become charged with the vapor arising from the surface of the liquid extraneously heated; or I may close the valve O and open the valve P, lift the vessel F, or otherwise move it away from the source of heat, T. In that case a current of hot air will pass over a comparatively cold liquid and become charged with the evaporation from the surface of the liquid; or I may place the vessel F in such proximity to the source of heat as that the liquid will itself be heated, so that a current of hot air will receive the evaporation from a hot liquid; and, finally, I may effect, therefore, graduation of the heat in any of the foregoing instances by causing a mixture of hot and cold air at the point M, or by moving the vessel F in or out of range of the source of heat, T, or by doing both. It will of course be obvious that in lieu of applying a source of heat to the coil M, I may apply there any source of cold, such as packed ice and salt or any freezing-mixture, or any substances capable of rapid evaporation, so that I may send a cold current through the vessel F instead of a hot one, or so that I may reduce the temperature of the current admitted from the source of air-supply by suitable adjustments of the valves O and P. My apparatus is adaptable to any employment which requires the production of a current of air or gas charged with any given vapor and artificially heated or cooled. It may be employed for enriching a weak gas with hydrocarbon vapor, so as to augment its illuminating capacity, for the distribution of air charged with disinfectants or antiseptic solutions; and while it is not at all restricted in its application to medical or surgical employments, it may be usefully applied to such purposes—as, for example, the production of sprays for local anæsthesia or the treatment of surgical wounds or of diseased parts, or in dentistry for what is now known as obtunding the sensitiveness of exposed nerve-pulp.

I claim—

1. The combination of a closed vessel adapted to contain a liquid, a tube entering said vessel and terminating above and in proximity to the surface of said liquid, a means, such as a rotary wheel at the lower end of said tube, of scattering or diffusing over the said liquid surface an air-current escaping from said tube, and an opening in said vessel above said liquid surface, substantially as described.

2. The combination of a closed vessel adapted to contain a liquid, two tubes entering said vessel and terminating above the liquid therein, a branch tube communicating at both ends with one of said tubes, a means, such as a lamp in proximity to said branch tube, arranged to heat said tube, and a valve in said branch tube, substantially as described.

3. The combination of a closed vessel adapted to contain a liquid, two tubes entering said vessel and terminating above the liquid therein, a branch tube communicating at both ends with one of said tubes, a means, such as a lamp in proximity to said branch tube, arranged to heat said tube, and a valve in said main tube between the points of connection of the branch tube thereto, substantially as described.

4. The combination of the closed vessel F, adapted to contain a liquid, the tube A, entering said vessel and terminating about and in proximity to the liquid surface, loop-tube L, communicating at both ends with the tube A, a source of heat, such as a lamp, T, and tube K, also entering said vessel F and terminating above the liquid, the vessel F being disposed above the lamp T, and the loop-tube L being interposed between said lamp and said vessel, substantially as described.

HERBERT F. WILLIAMS.

Witnesses:
LAW BENJAMIN,
M. BOSCH.